(12) United States Patent
Legrand

(10) Patent No.: US 10,449,837 B2
(45) Date of Patent: Oct. 22, 2019

(54) LAMINATED GLASS

(71) Applicant: AGC GLASS EUROPE, Louvain-la-Neuve (BE)

(72) Inventor: Denis Legrand, Wargnies (FR)

(73) Assignee: AGC GLASS EUROPE, Louvain-la-Neuve (BE)

(*) Notice: Subject to any disclaimer, the term of this patent is extended or adjusted under 35 U.S.C. 154(b) by 91 days.

(21) Appl. No.: 15/537,249

(22) PCT Filed: Dec. 16, 2015

(86) PCT No.: PCT/EP2015/080083
§ 371 (c)(1),
(2) Date: Jun. 16, 2017

(87) PCT Pub. No.: WO2016/097044
PCT Pub. Date: Jun. 23, 2016

(65) Prior Publication Data
US 2018/0037094 A1    Feb. 8, 2018

(30) Foreign Application Priority Data
Dec. 19, 2014    (EP) ..................................... 14199137

(51) Int. Cl.
*B32B 3/10*    (2006.01)
*B60J 1/02*    (2006.01)
*B32B 17/10*    (2006.01)
*B60J 1/00*    (2006.01)

(52) U.S. Cl.
CPC .......... *B60J 1/02* (2013.01); *B32B 17/10036* (2013.01); *B32B 17/1066* (2013.01); *B32B 17/10348* (2013.01); *B32B 17/10651* (2013.01); *B32B 17/10761* (2013.01); *B60J 1/001* (2013.01); *B32B 2307/41* (2013.01); *B32B 2605/006* (2013.01)

(58) Field of Classification Search
None
See application file for complete search history.

(56) References Cited

U.S. PATENT DOCUMENTS

| | | |
|---|---|---|
| 2002/0039649 A1 | 4/2002 | Nagai |
| 2004/0160688 A1 | 8/2004 | Noguchi et al. |
| 2006/0250711 A1 | 11/2006 | Noguchi et al. |
| 2009/0098354 A1 | 4/2009 | Torr |

(Continued)

FOREIGN PATENT DOCUMENTS

| | | |
|---|---|---|
| EP | 1 193 048 A2 | 4/2002 |
| EP | 1 464 632 A1 | 10/2004 |

(Continued)

OTHER PUBLICATIONS

International Search Report dated Apr. 4, 2016, in PCT/EP2015/080083 filed Dec. 16, 2015.

*Primary Examiner* — Christopher M Polley
(74) *Attorney, Agent, or Firm* — Oblon, McClelland, Maier & Neustadt, L.L.P.

(57) ABSTRACT

The invention relates to laminated glass comprising first (11) and second (12) sheets of glass laminated using at least one thermoplastic interlayer (20). According to the invention, such glass comprises at least one thermoplastic interlayer (20) including a zone that is opaque at visible wavelengths (21).

14 Claims, 2 Drawing Sheets

(56) References Cited

U.S. PATENT DOCUMENTS

| | | | | |
|---|---|---|---|---|
| 2014/0272338 A1* | 9/2014 | Vandal | ............. | B32B 17/10266 |
| | | | | 428/204 |
| 2016/0185656 A1* | 6/2016 | Danneels | ................. | C03C 8/02 |
| | | | | 428/210 |
| 2016/0297176 A1* | 10/2016 | Rickerl | ............ | B32B 17/10036 |

FOREIGN PATENT DOCUMENTS

| | | | | |
|---|---|---|---|---|
| GB | 2 264 452 A | 9/1993 | | |
| GB | 2482513 A | 2/2012 | | |
| WO | WO 2007/077466 A2 | 7/2007 | | |
| WO | WO 2007/093828 A1 | 8/2007 | | |
| WO | WO-2013023832 A1 * | 2/2013 | .............. | C03C 8/02 |
| WO | WO 2014/077328 A1 | 5/2014 | | |

* cited by examiner

LAMINATED GLASS

The invention relates to glazings comprising patterns which limit light transmission. A large part of motor vehicle glazings comprise enameled patterns intended to conceal unsightly elements, in particular glue seals, electrical connections, and the like. Conventionally, these patterns are obtained by application of a composition comprising a glass frit, pigments and a vector in which the frit and the pigments are suspended. The application of these enamel compositions is followed by a high-temperature firing which melts the frit and attaches the enamel to the support.

While a large part of motor vehicle glazings comprise patterns of this type, architectural glazings or glazings for industrial use may also exhibit such patterns which very greatly limit light transmission. For this reason, even if the invention is first intended for application to motor vehicle glazings, it also relates to the other types of glazings and generally to all applications of patterns to glass sheets, in particular when these glazings exhibit constraints, in their composition or in their use, in particular as regards heat treatments.

For simplicity, the continuation of the description refers essentially to motor vehicle glazings, it being understood that this does not limit the subject matter of the invention.

Most commonly, the application of the enameled patterns to the glass is carried out by a screen printing technique. The composition applied is dried, in order to remove the greater part of the vector, and subjected to a firing intended to attach the constituents to the glass sheet. The firing of the enamel composition can be carried out during a treatment for shaping the sheet. The temperature conditions under which the shaping occurs, whether it is a tempering or a bending, are such that the melting point of the frit is greatly exceeded.

One difficulty is to prevent the molten composition from adhering to the objects in contact with the sheet during this operation. In particular, in the bending of assemblies comprising two identical sheets intended to constitute a laminated glazing, it is necessary to take precautions in order for the enamel composition not to be transferred from one sheet to the other.

Furthermore, the presence of the enamel composition on a glass sheet leads to various difficulties in the implementation of these bending/tempering operations, by locally modifying the thermal behavior of the sheet. This is because the presence of the enamel is results in substantial difference in absorption of the thermal radiation, leading locally to differences in the shaping kinetics. These differences, if they are not taken into account in the treatment conditions, lead to irregularities in the shaping.

The difficulties of the type of those indicated above are well known. Solutions also known make it possible to overcome these difficulties more conveniently the less complex the shape imposed on the sheets. For very complex shapes, it is generally necessary to shape the sheets by means of a partial pressing which necessarily results in contact with the enameled parts.

In order to avoid these difficulties and to meet the requirements of concealing, the invention provides glazings and in particular laminated glazings comprising a thermoplastic interlayer comprising a zone that is opaque to visible wavelength radiation. In particular, the invention consists in replacing the screen printing normally used on at least the face 2 in order to conceal the edge of the glazings with a thermoplastic interlayer film comprising a zone that is opaque to visible wavelength radiation. The use of this thermoplastic interlayer comprising a zone that is opaque to visible wavelength radiation and thus devoid of frit does not require a "firing" at a relatively high temperature, such as that reached with enamel compositions.

For simplicity, the numbering of the glass sheets in the continuation of the description refers to the numbering nomenclature conventionally used for glazings. Thus, the face of the laminate which is in contact with the environment external to the vehicle is known as being the face 1 and the surface in contact with the internal medium, that is to say the passenger compartment of the vehicle, is known as face 4.

In order to avoid any doubt, the terms "external" and "internal" refer to the orientation of the glazing during the installation as glazing in a vehicle.

Conventionally, laminated glazings for a motor vehicle are printed over the entire periphery of the edges of the glazing on face 2 to form an occultation strip, in order, on the one hand, to protect, from UV radiation, the glue which makes it possible to adhere all the busbars and electrical connectors and the cable harness of the vehicle and, on the other hand, to conceal these elements.

Thus, the aim of the strip is twofold: on the one hand, esthetics, as, from the outside, none of these elements is visible from the outside and, on the other hand, to prevent damage to the glue or other components from exposure to UV radiation.

Generally, the printing used is enamel screen printing. This is because the enamel makes it possible to provide the required optical qualities and sufficient concealment of the elements, such as those mentioned above.

However, screen printing on glass sheets is not without disadvantages. In a laminate, the enamel is screen printed on the internal face of the glass sheet intended for the external position, that is to say in contact with the atmosphere, known as face 2, and/or on the external face of the glass sheet intended for the internal position, known as face 4, which is in contact with the internal atmosphere, in particular of the passenger compartment of a vehicle.

Furthermore, the solutions of the prior art require the provision of plants for the prefiring of this enamel intended for the face 2. These plants thus represent a cost related to the capital cost of the equipment, to the upkeep, to the energy consumption, to the maintenance, and the like.

Furthermore, the presence of enamel strips on the faces 2 and 4 is not without effect on the behavior of the glass during its bending as these strips cause the glass to absorb infrared (IR) radiation, locally over the periphery of the glazing, whereas the internal surface of the glass will only slightly absorb it; this is all the truer for windshields, for which the glass sheets are generally clear glasses; this is all the truer still when reflecting layers are used. In this implementation, highly absorbing zones rub shoulders with highly reflecting zones.

This results in a glass defect known as "burn line", which is a local deformation related to these two phenomena and parallel to the black enamel strips; they are stronger as the black strips are wider. This is the reason why these burn lines are essentially visible as a top and bottom strip of the windshield, that is to say the lower and upper zones of the windshield. The lateral black strips are generally thin, so as to maximize the field of view.

In order to as much as possible reduce these optical defects, it is known to add, to the bending equipment, thermal masses which will, wherever possible, absorb the heat captured by the zones of the glass locally overheated by the presence of the black strips.

These masses also have an impact on the consumption energy balance of the furnace and also on the cycle times, depending on the complexity of the products to be bent.

Thus, the presence of enamel strips impacts not only the process but also the optical quality of the products.

According to the invention, the thermoplastic interlayer comprising a zone that is opaque to visible wavelength radiation, in order to conceal unsightly elements, in particular glue seals, electrical connections, and the like, is advantageously applied to the face 2 of the laminated glazing during the assembling operations comprising a passage through the oven and under pressure (also known as lamination).

A zone that is opaque to visible wavelength radiation is understood to mean a zone, the light transmission of which is less than 5% and preferably equal to 0% of the incident light. This opaque zone, contrary to the enamel, makes it possible both to conceal elements, such as connections (busbars, and the like), the glue, and the like, as would be done by the enamel, but especially simplifies the process of formation of a laminated glazing comprising elements which have to be concealed, as well from the outside as from the inside of the passenger compartment.

For the sake of simplicity, in the remainder of the description, the term "the opaque zone" will refer to the zone that is opaque to visible wavelength radiation.

The appearance of the opaque zone has to be strictly homogeneous when it is a coating the purpose of which is first esthetic. For the same reasons, the opaque zone has to have very precise outlines, despite the difficulty resulting from the nature of the support.

As emerges from the preceding indications, the use of a thermoplastic interlayer comprising an opaque zone constitutes a characteristic of the invention which distinguishes it from the enamels normally employed.

For the opaque zone used on the glazings in order to hide the underlying elements, the opaqueness required is such that the light transmission is less than 5% and preferably less than 3% and more preferably still equal to 0%.

It is thus an aim of the invention to make available a laminated glazing comprising a thermoplastic interlayer comprising a zone that is opaque to visible wavelength radiation making it possible to conceal unsightly elements.

This aim is achieved by the invention, a subject matter of which is a laminated glazing comprising a first and a second glass sheet assembled (laminated) by means of at least one thermoplastic interlayer.

According to the invention, the laminated glazing comprises the at least one thermoplastic interlayer comprising a zone that is opaque to visible wavelength radiation.

According to a preferred embodiment of the invention, said opaque zone extends over the whole of the periphery of the glass sheet to which it is applied, just like the enamel layer. This opaque zone thus substitutes for the enamel conventionally used.

According to a specific embodiment of the invention, the opaque zone can extend over a wide portion of the laminated glazing.

According to a preferred embodiment of the invention, said opaque zone extends over the whole of the periphery of the internal face of the external glass sheet, that is to say on face 2.

Thus, by virtue of the invention, the process for concealing the unsightly elements is simplified and can be carried out during the process of assembling (of laminating) the laminated glazing.

According to a preferred embodiment of the invention, the thermoplastic interlayer comprising an opaque zone is formed from an opaque frame positioned around the non-opaque zone.

According to a specific embodiment of the invention, a thermoplastic interlayer opaque in its entirety and of a size making possible the lamination of the glass sheets together can be emptied of its central part in order to form a frame. The central part is then replaced with a nonopaque or transparent thermoplastic interlayer. These two parts, during the lamination process, will fuse so as to form a single part. Advantageously, the frame is formed of strips of opaque interlayer, for example a PVB or an EVA, colored black throughout, juxtaposed, the strips being positioned around a central part of a thermoplastic interlayer; the parts will fuse together so as to form the thermoplastic interlayer, which will extend over the entire periphery of the glass sheets.

The at least one thermoplastic interlayer can be of any material known in the art capable of forming a laminate. It can be an ethylene/vinyl acetate copolymer, polyurethane, polycarbonate, polyvinyl butyral, polyvinyl chloride or a copolymer of ethylene and of methacrylic acid. According to a preferred embodiment of the invention, the thermoplastic interlayer comprising a zone that is opaque to visible wavelength radiation is a sheet of polyvinyl butyral (PVB) or of ethylene/vinyl acetate (EVA).

It is generally available in a thickness of between 0.38 and 1.1 mm but generally of 0.76 mm.

According to a preferred embodiment of the invention, the thermoplastic interlayer comprising an opaque zone is obtained by bulk coloring of the periphery of the interlayer.

According to a preferred embodiment of the invention, the thermoplastic interlayer comprising an opaque zone is obtained by juxtaposition of an opaque colored thermoplastic interlayer frame and of a central part formed of a transparent interlayer, it being possible for the opaque frame and the central part of the thermoplastic interlayer to be in an identical or different thermoplastic material, one being colored and the other uncolored.

According to a specific embodiment of the invention, the dimensions of the opaque zone are similar to those normally used for an enamel layer. It is understood that they can be greater or lower than those of the enamel layer, the aim being for the opaque zone to be sufficiently wide to conceal the elements glued to the glazing, such as busbars, connections, and the like.

According to a specific embodiment of the invention, the thermoplastic interlayer comprising a zone that is opaque to visible wavelength radiation according to the invention is positioned substantially on the surface of the glazing.

Advantageously, the laminated glazing additionally comprises a second thermoplastic interlayer. Preferably, the second thermoplastic interlayer is preferably a sheet of polyvinyl butyral (PVB).

According to an advantageous embodiment of the invention, additional thermoplastic interlayers can be positioned between the thermoplastic interlayer comprising an opaque zone and the second glass sheet. In this specific embodiment of the invention, the thermoplastic interlayers are chosen from a copolymer of polyvinyl butyral or of ethylene/vinyl acetate, or of polyurethane, or of polycarbonate.

According to a specific embodiment of the invention, only the lower and upper peripheral zones of the glazing are covered with the opaque zone of the thermoplastic interlayer, while the lateral (left-right) zones of the laminated glazing are provided with an enamel layer.

Furthermore, the choice of the interlayers may be dictated by the need to minimize excessive exposure of the glazing to UV radiation. The choice of the interlayers makes it possible to considerably restrict this exposure. This is the case in particular of the use of PVB interlayers, which by nature screen out UV radiation, allowing only a very small proportion of the latter to pass. For PVB films with a thickness of 0.38 mm, more than 95% of the UV radiation is suppressed. This proportion can exceed 99%. Polymers based on ethylene/vinyl acetate (EVA) are also proposed which include components conferring on them a very low transmission of UV radiation.

Advantageously, the at least thermoplastic interlayer according to the invention comprises a nonopaque zone which is formed from a thermoplastic interlayer which screens out UV radiation, also known as "UV-cut".

In order to achieve certain light transmission values, at least one of the glass sheets used in the laminated glazing can be colored. The glazing can also include colored interlayers which contribute to the establishment of the desired optical conditions.

Thus, colored thermoplastic interlayers can be superimposed so as to obtain a specific color and/or specific optical conditions.

According to a specific embodiment of the invention, the nonopaque part of the interlayer comprising an opaque zone is formed by juxtaposition of pieces of colored thermoplastic interlayers, so as to obtain, for example, a shading of colors or specific patterns.

Moreover, a subject matter of the invention is a process for manufacturing a laminated glazing as described above.

The advantages of this process are the same as those of the devices; they are not described more fully in detail.

The invention also relates to the use of at least one thermoplastic interlayer comprising a zone that is opaque to visible wavelength radiation, for concealing unsightly elements comprised between two glass sheets.

For a better understanding, the present invention will now be described in more detail by way of nonlimiting example, with reference to the following figures, in which:

FIG. 1 shows a schematic plan view of a known glazing 10 of the prior art comprising an enamel layer on faces 2 and 4.

Figure 1:
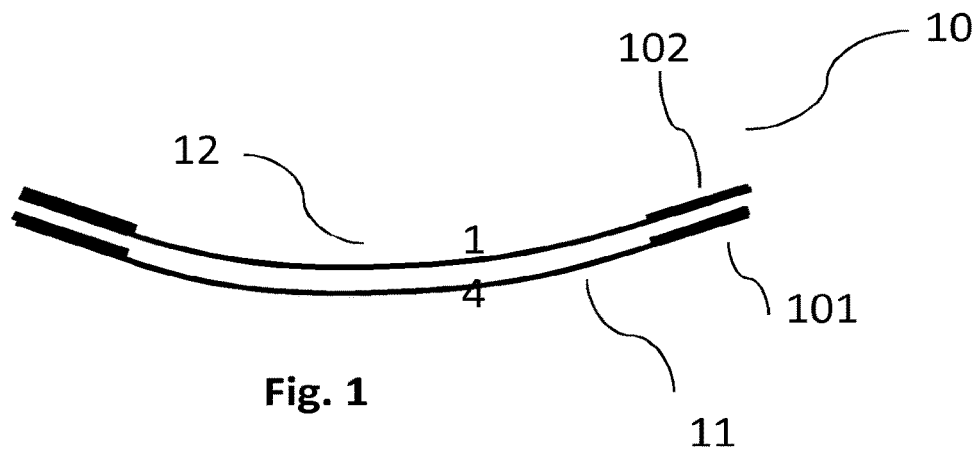

FIG. 1 shows a known laminated glazing of the prior art, in the form of a windshield for a motor vehicle 10. Around the periphery of the windshield for a motor vehicle 10 is positioned, on faces 2 and 4, an occultation strip 101 and 102, more specifically an enamel layer, the role of which is, on the one hand, to conceal and protect the tightness material (not represented) which is used to attach the window in a vehicle (not represented) and, on the other hand, to conceal the electrical connections (busbars, and the like) which provide electrical energy to the glazing, if need be. The face of the laminate which is in contact with the environment external to the vehicle is known as being the face 1 and the surface in contact with the internal medium, that is to say the passenger compartment of the vehicle, is known as face 4. Thus, the faces of the glass sheets are numbered from 1 to 4 in the figures. In practice, windshields exhibit curvatures which are ordinarily more accentuated at the edges in the place where they are joined to the body for a fit chosen for its design, the aerodynamics corresponding to a good surface continuity between the contiguous elements.

The presence of enamel strips on the faces 2 and 4 is not without effect on the behavior of the glass during its bending as these strips cause the glass to absorb infrared (IR) radiation, locally over the periphery of the glazing, whereas the internal surface of the glass will only slightly absorb it; this is all the truer for windshields, for which the glass sheets are generally clear glasses; this is all the truer still when reflecting layers are used. In this implementation, highly absorbing zones rub shoulders with highly reflecting zones.

This results in a defect of the glass known as "burn line", which is a local deformation related to these two phenomena and parallel to the black enamel strips; they are stronger as the black strips are wider. This is the reason why these "burn lines" are essentially visible as a top and bottom strip of the windshields. The lateral black strips are always thin (field of view to be maximized).

Figure 2:
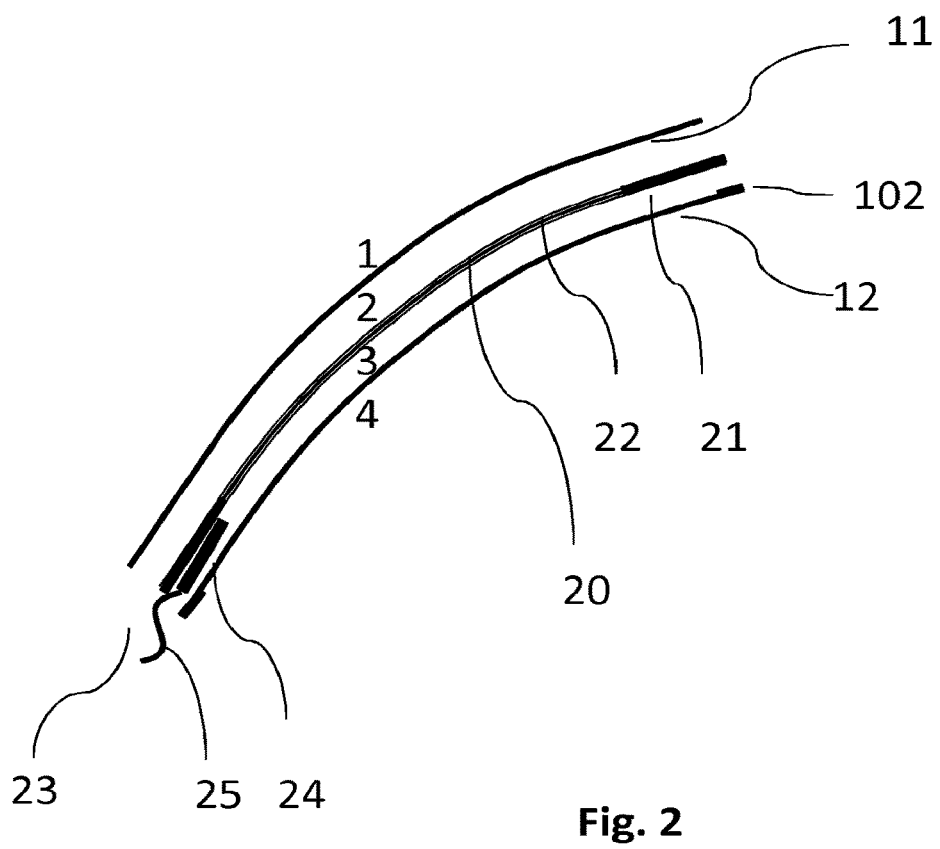
FIG. 2 shows a schematic plan view of a glazing 10 according to the invention comprising a thermoplastic interlayer comprising a zone that is opaque to visible wavelength radiation.

The glass sheets 11 and 12 as illustrated in FIGS. 1 and 2 are glasses of soda-lime-silica type. One or both glass sheets can be sheets of clear glass of soda-lime-silica type with the following composition (by weight): $SiO_2$ 68-75%; $Al_2O_3$ at 0-5%; $Na_2O$ 10-18%; $K_2O$ at 0-5%; MgO 0-10%; CaO 5 to 15%; $SO_3$ 0-2%. The glass can also contain other additives, such as, for example, refining adjuvants, in an amount ranging up to 2%.

According to a specific embodiment of the invention, the internal glass sheet of the laminated glazing can be made of glass colored throughout, the composition of which can comprise one or more of the following colorants: iron oxide, cobalt oxide, selenium, chromium oxide, titanium oxide, manganese oxide, copper oxide, vanadium oxide or nickel oxide. It is understood that the two glass sheets can be made of clear glass. One or the glass sheets can be made of tempered glass. The glass sheets can be flat or curved. Each glass sheet can have a thickness of between 0.5 and 25 mm in thickness, preferably between 1 and 5 mm. The total thickness of the motor vehicle glazing can thus be between 1.5 and 100 mm, preferably between 2 and 50 mm and more preferably between 2.5 and 20 mm. Preferably, the glazing has a transmission of visible light (measured with the illuminant CIE A) of greater than 70% and more preferably of greater than 75% when the two glass sheets and the layers of thermoplastic interlayers are substantially clear. If the glazing overall exhibits a color (because either the internal glass sheet of the glazing is colored throughout or one or more folds of the intermediate layer material is colored), it preferably has a visible light transmission (measured by the CIE Illuminant A) of less than 40%, more preferably of less than 30% and preferably of less than 25%, and a total energy transmission (Parry Moon, Air Mass 1.5) of less than 30%, more preferably of less than 25% and preferably of less than 20%.

Figure 3:
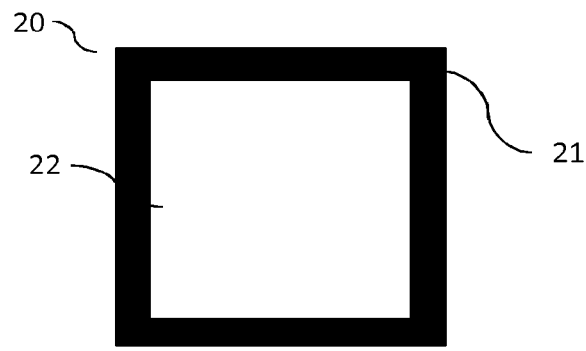
FIG. 3 shows a schematic plan view of a thermoplastic interlayer comprising a zone that is opaque to visible wavelength radiation, said opaque zone framing a nonopaque zone.

FIG. 2 shows a laminated glazing, more specifically a windshield, according to the invention in which there is provided, on face 2 of the glass sheet 11, a thermoplastic interlayer 20 comprising a zone 21 that is opaque to visible wavelength radiation, said opaque zone extending over the entire periphery of a nonopaque zone 22 of the thermoplastic interlayer 20. Such a thermoplastic interlayer is represented in FIG. 3. In contrast to FIG. 1, the face 2 of the external glass sheet 11 is devoid of an enamel layer.

According to this specific embodiment, the opaque zone is formed of a black PVB dyed throughout exhibiting a light transmission of 0%. The nonopaque zone 22 is in this instance represented by a clear PVB and preferably a PVB which blocks UV radiation. Such a PVB is also known as "UV-cut PVB". There is also represented, in FIG. 2, a circuit which conducts electricity 23 formed of a busbar 24 and of connections 25, which is positioned at the periphery of the laminated glazing on face 3. This conducting circuit is well known to a person skilled in the art and its positioning is conventional in this type of glazing. However, it can be positioned on another part of the laminated glazing. The opaque zone 21 provided on the upper and lower peripheral zones of the laminated glazing (orientation according to the top/bottom arrangement of the glazing on the motor vehicle as windshield) has to have dimensions sufficient to conceal in particular the gluing of the upper lip of the upper tightness seal intended to receive the laminated glazing when it is fitted to the motor vehicle and also the gluing of the gutter seal positioned at the lower periphery of the glazing.

According to this specific embodiment of the invention, the thermoplastic interlayer 20 comprising an opaque zone 21, extending over the entire surface of the laminated glazing, said opaque layer for its part extending over the entire periphery of the thermoplastic interlayer 20. Thus, as a result of the extension of the thermoplastic interlayer up to the edges of the laminated glazing, this makes it possible to prevent the risk of flaking/removal of the screen printing on face 2 during the trimming of the excess PVB.

Equally, by virtue of the invention, the glitter line is eliminated, since the same thermoplastic interlayer is used both to opacify the zone to be concealed (via the zone that is opaque to visible wavelength radiation) and to make possible the lamination of the 2 glass sheets, since the thermoplastic interlayer extends over the entire surface of the laminated glazing.

According to a specific embodiment of the invention, only the lower and upper peripheral zones of the laminated glazing are provided with the opaque zone of the interlayer; the lateral zones are provided with strips of screen-printed enamel which are thin, in order to maximize the field of view.

In addition, as shown in FIG. 2, an enamel layer 102 may be present on the face 4 of the glazing, so as to conceal the connections, such as busbars and the connectors, or else glue making it possible to glue these elements, and the like, seen from the inside of the vehicle.

Figure 4:
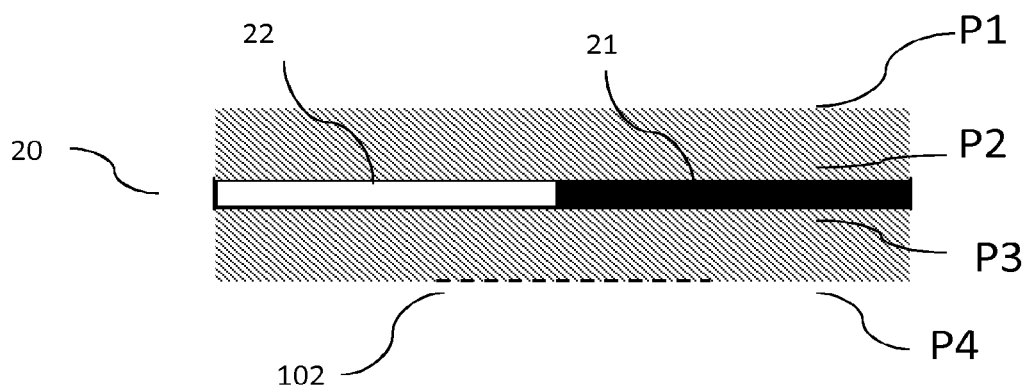
FIG. 4 shows a schematic plan view of a glazing 10 according to the invention comprising an enamel layer comprising dots positioned on face 4.

FIG. 3 shows the at least first thermoplastic interlayer 20 according to a specific embodiment of the invention. The opaque zone 21 is found at the periphery of the thermoplastic interlayer 20. The thermoplastic interlayer 20 is slightly greater in size than the glass sheets 11 and 16, so that it extends over the entire surface of the glass sheets. The opaque zone 21 according to this specific embodiment takes the form of a frame produced from a colored thermoplastic interlayer, the light transmission of which is 0%. In particular, the frame is produced from a black PVB surrounding the nonopaque zone 22 which it is formed of a transparent PVB which screens out UV radiation, allowing only a very small proportion of the latter to pass. For PVB interlayers with a thickness of 0.38 mm, more than 95% of the UV radiation is eliminated. This proportion can exceed 99%. Polymers based on ethylene/vinyl acetate (EVA) are also proposed which include components conferring on them a very low transmission of UV radiation. It is understood that any thermoplastic interlayer exhibiting these characteristics, namely a transmission of less than 5% and preferably equal to 0%, can be used to form this opaque zone. The dimensions of the opaque zone are generally equivalent to those normally used for the occultation strip. These dimensions will depend in particular on the zone to be concealed. Thus, the at least first thermoplastic interlayer as represented by FIG. 2 is formed of a frame of PVB colored throughout positioned on the circumference/periphery of a transparent PVB, so as to form the thermoplastic interlayer according to the invention. It is understood that this frame can be formed by different strips positioned so as to form said frame, the strips fusing during the stoving so as to form a single piece. However, it can be made up and applied using any other known means. The interlayer is subsequently provided on at least the face 2 (P2) of the external glass sheet. It can, of course, also be provided on the face 4 (P4). According to a specific embodiment of the invention as shown, by way of example, in FIG. 4, the continuous enamel layer 102 can be replaced by a enamel strip exhibiting a network of holes preferably exhibiting a tight uniform distribution of small holes commonly known as dots.

In this specific embodiment of the invention, the width of the enamel strip exhibiting these dots is between 4 and 30 mm. This enamel strip 102 exhibiting the dots preferably exhibits an overlap between the dots and the zone that is opaque to visible wavelength radiation 21, the light transmission of which is preferably less than 5% and more preferably 0% of the incident light, of a thermoplastic interlayer 20. Preferably, the enamel strip exhibiting the dots is superimposed on the zone that is opaque to visible wavelength radiation 21, the light transmission of which is preferably less than 5% and more preferably 0% of the incident light, of the thermoplastic interlayer 20, over a distance of between 0 and 10 mm. This overlap is important, in particular for the lateral strips, as the dots on face 4 (commonly known as P4) will not have the same color as the opaque zone of the thermoplastic interlayer and particularly of an opaque zone made of a black PVB, seen from the inside of the vehicle. It is understood that the distance of superimposition will be adjusted to each model, according to the distance of visibility from the passenger compartment.

The presence of the enamel strip exhibiting dots instead of a complete enamel strip on face 4 (P4), combined with a thermoplastic interlayer exhibiting, at its periphery, a zone that is opaque to visible wavelength radiation 21, the light transmission of which is preferably less than 5% and more preferably 0% of the incident light, makes it possible to use less black strip width on P4. Thus, the presence of the burn line (deformation of the white lines in the bottom part of the windshields) is greatly reduced. This is because the improvement makes it possible to reduce the value from 400 mdpt (millidiopters) to less than 100 mdpt without a low strip of enamel on face 4 (P4). Furthermore, according to this implementation, it is possible to add peripheral bars to the periphery of the face 4 (P4) (which will preferably be gray) and which will act as glue track.

Finally, by virtue of the invention, it is possible to dispense with the use of a primer intended to improve the adhesion of the glue to the glazing or to protect the glue during the application of a glue to a glazing according to the invention in order to attach it to the vehicle. This is because, in the context of the invention, a primerless glue can be used without a concealing and/or protecting element on face 1 if it is protected between the faces 2 and 3 by a thermoplastic interlayer comprising, at its periphery, a zone with a light transmission of 0%. In particular, this is all the truer when this peripheral portion is formed of a black PVB.

A laminated glazing according to the invention can be fitted into any window of a vehicle.

It can particularly and preferably be used as a motor vehicle windshield.

Furthermore, a laminated glazing according to the invention can be provided with an additional functionality, by inclusion of appropriate elements, such as a hydrophilic or hydrophobic coating on face 1 or face 4. For example, laminated glazings, as used as windshield or rear window of a motor vehicle, comprise numerous functionalities, such as the interior rear-view mirror support, busbars making it possible to convey an electric current, an upper strip screening out solar radiation, having a possibly shaded coloring, a rain detector, and the like.

The application of a thermoplastic interlayer 20 comprising an opaque zone 21 to glazings of complex shape, such as windshields, is not necessarily limited to the opaque strips concealing the location of the gluing or any other unsightly element. The same technique can be used for installing any decorative or identifying element, whether the latter is opaque or nonopaque.

The thermoplastic interlayer comprising an opaque zone is in particular incorporated in assemblages which shelter them from risks of abrasion or of chemical attack. This is the case in particular with laminated glazings. For the latter, the thermoplastic interlayer comprising an opaque zone is advantageously positioned between the sheets constituting the glazing, whether the latter comprises two glass sheets assembled by means of an interlayer of the PVB type or else whether the glazing is of the bi-layer type, composed of a glass sheet combined with an organic sheet of polyurethane type. The thermoplastic interlayer comprising an opaque zone can also be applied to an "internal" face of multiple glazings. Finally, when just one glass sheet is used, the opaque zone of the thermoplastic interlayer, which would be exposed to risks of mechanical or chemical degradation, can be protected by a protective coating applied either uniformly over the whole of the glazing or locally over the opaque zone.

The invention claimed is:

1. A laminated glazing comprising:
   a first glass sheet and a second glass sheet laminated by at least one thermoplastic interlayer; and
   an enamel strip on an external face 4 of the second glass sheet,
   wherein the at least one thermoplastic interlayer comprises a zone that is opaque to visible wavelength radiation.

2. The laminated glazing according to claim 1, wherein the opaque zone extends over a periphery of at least one of the first and second glass sheets.

3. The laminated glazing according to claim 1, wherein the opaque zone extends over a periphery of an internal face 2 of the first glass sheet.

4. The laminated glazing according to claim 1, wherein the at least one thermoplastic interlayer is formed by an opaque zone, the light transmission of which is less than 5% of incident light.

5. The laminated glazing according to claim 1, wherein the at least one thermoplastic interlayer is formed by an opaque zone, the light transmission of which is 0% of incident light.

6. The laminated glazing according to claim 1, wherein the at least one thermoplastic interlayer is positioned substantially on a surface of the glazing.

7. The laminated glazing according to claim 1, wherein the at least one thermoplastic interlayer is formed from an opaque frame positioned around a nonopaque zone.

8. The laminated glazing according to claim 1, wherein the opaque zone extends over lower and upper edges of the laminated glazing.

9. The laminated glazing according to claim 1, wherein the at least one thermoplastic interlayer is a sheet comprising polyvinyl butyral or ethylene-vinyl acetate.

10. The laminated glazing according to claim 1, wherein the opaque zone is obtained by a bulk coloring of a periphery of the interlayer.

11. The laminated glazing according to claim 1, wherein the enamel strip comprises dots.

12. The laminated glazing according to claim 11, wherein the enamel strip overlaps the opaque zone over at least a portion.

13. The laminated glazing according to claim 11, wherein the enamel strip overlaps the opaque zone over a distance of between 4 and 30 mm.

14. The laminated glazing according to claim 1, which is a windshield for a motor vehicle.

* * * * *